(12) United States Patent
Hariharasubrahmanian

(10) Patent No.: US 7,009,967 B1
(45) Date of Patent: Mar. 7, 2006

(54) SYSTEMS AND METHODS FOR TRANSMITTING DATA PACKETS

(76) Inventor: Shrikumar Hariharasubrahmanian, 1381 S. East St., Amherst, MA (US) 01002

( * ) Notice: Subject to any disclaimer, the term of this patent is extended or adjusted under 35 U.S.C. 154(b) by 749 days.

(21) Appl. No.: 09/632,845

(22) Filed: Aug. 4, 2000

Related U.S. Application Data

(60) Provisional application No. 60/147,764, filed on Aug. 7, 1999.

(51) Int. Cl.
  *H04L 12/28* (2006.01)
  *H04L 12/56* (2006.01)
(52) U.S. Cl. ........................... 370/389; 370/394
(58) Field of Classification Search .............. 370/394, 370/474, 230, 231, 232–236, 252, 465, 389, 370/401
See application file for complete search history.

(56) References Cited

U.S. PATENT DOCUMENTS

| | | | | |
|---|---|---|---|---|
| 4,617,657 A | * | 10/1986 | Drynan et al. | ............... 370/394 |
| 5,245,616 A | * | 9/1993 | Olson | ........................ 714/748 |
| 5,440,545 A | * | 8/1995 | Buchholz et al. | ........... 370/426 |
| 5,553,063 A | * | 9/1996 | Dickson | ..................... 370/294 |
| 5,852,721 A | | 12/1998 | Dillon et al. | |
| 6,006,268 A | * | 12/1999 | Coile et al. | .................. 709/227 |
| 6,034,963 A | * | 3/2000 | Minami et al. | ............. 370/401 |
| 6,091,733 A | | 7/2000 | Takagi et al. | |
| 6,134,237 A | * | 10/2000 | Brailean et al. | ............. 370/394 |
| 6,389,016 B1 | * | 5/2002 | Sabaa et al. | ................. 370/389 |
| 6,392,993 B1 | * | 5/2002 | Hamilton et al. | ........... 370/230 |
| 6,424,625 B1 | * | 7/2002 | Larsson et al. | ............. 370/236 |
| 6,487,689 B1 | * | 11/2002 | Chuah | ........................ 714/748 |

OTHER PUBLICATIONS

Internet Engineering Task Force, "Requirements for Internet Hosts—Communication Layers," RFC1122, Oct. 1989, pp. 1-115.

Douglas E. Comer, Internetworking with TCP/IP; vol. I, Principles, Protocols, and Architecture; 1995; pp. 203-205.

\* cited by examiner

*Primary Examiner*—Ajit Patel
*Assistant Examiner*—Chirag Shah
(74) *Attorney, Agent, or Firm*—Cesari and McKenna, LLP

(57) ABSTRACT

Methods and systems for transmitting data packets enable a communication device having limited memory to transmit data files in a packet-based network. The communication device partitions the sequence number field transmitted with a data packet into multiple portions. The communication device then generates a sequence number corresponding to the portions, where at least one portion identifies a particular segment of the data file. The communication device then transmits a data packet including a segment of a data file and the sequence number to a receiving device. When the communication device receives the acknowledgement packet from the receiving device, the communication device may determine which segment of the data file to transmit next.

26 Claims, 6 Drawing Sheets

| SOURCE PORT | DESTINATION PORT |
|---|---|
| SEQUENCE NUMBER ||
| ACKNOWLEDGE NUMBER ||
| HEADER LENGTH / RESERVED / FLAGS / WINDOW SIZE ||
| CHECKSUM | URGENT POINTER |
| OPTIONS ||
| DATA ||

SYSTEMS AND METHODS FOR TRANSMITTING DATA PACKETS

This application claims priority under 35 U.S.C. § 119(e) based on U.S. Provisional Application Ser. No. 60/147,764, filed Aug. 7, 1999, the disclosure of which is incorporated herein by reference.

FIELD OF THE INVENTION

The present invention relates generally to networks and, more particularly, to systems and methods for transmitting data packets in a network.

BACKGROUND OF THE INVENTION

Communication networks permit communication devices, such as personal computers, servers, laptops, personal digital assistants (PDAs), and other similar devices, to communicate with one another. Recently, household appliances have begun including micro-controllers and/or microcomputers that allow these appliances to communicate over a communication network, such as the Internet.

Communication over these networks is often governed by a packetization protocol and a corresponding packet exchange protocol that specifies how the communication devices on the network must operate under various circumstances. These protocols are specified under the relevant standards and are applicable to the domains in which the communication devices operate.

Packetization and packet exchange protocols usually require that a communication device involved in data communications transmit a data file as a series of discrete packets. A conventional communication device must typically store various record information associated with the transmitted data packet in its local memory. For example, the communication device may store a pointer in its local memory indicating what portion of the data file has been sent. This communication device may then use the pointer information to determine what portion of the file to transmit in the next packet. When a number of data conversations are occurring at the same time, storing pointer information in this manner requires that the communication device have a large amount of local memory.

Some communication devices, such as mini-computers, micro-controllers, and microcomputers, lack sufficient local memory to store the pointer information associated with transmitting data packets over a packet-based network. These devices, therefore, often associate themselves as slave devices to one or more host computers that contain the resources to perform operations on their behalf. For example, the host computers may store the file pointer information for the slave devices and transmit this information to the slave devices when required. Such arrangements can result in delays in the transmission of the packets and increase the cost of connecting the devices to the communication network.

Therefore, there exists a need for systems and methods that enable communication devices with limited memory capacity to communicate over a network.

SUMMARY OF THE INVENTION

Systems and methods consistent with the present invention address this and other needs by enabling a communication device to transmit data packets without requiring a large local memory to store various record information.

In accordance with the purpose of the invention as embodied and broadly described herein, a method for transmitting data as a number of segments in separate packets is provided, where each packet includes a sequence number field. The method includes partitioning the sequence number field into portions and generating a sequence number corresponding to the portions, where at least one portion of the sequence number identifies a particular segment of the data. The method also includes transmitting a data packet including a segment of the data and the sequence number to a receiving device and receiving an acknowledgement packet from the receiving device. The acknowledgement packet including an acknowledgment sequence number. The method further includes determining a next segment of the data to transmit based on the acknowledgment sequence number.

In another implementation consistent with the present invention, a system for transmitting data in a network is provided. The data includes a number of segments transmitted in separate packets. The system includes a memory configured to store instructions and a processor configured to execute the instructions. The instructions cause the processor to generate a sequence number including multiple portions, at least one portion indicating a particular segment of the data. The instructions also cause the processor to transmit a data packet including a segment of the data and the sequence number to a receiving device and receive an acknowledgement packet from the receiving device. The acknowledgement packet includes an acknowledgment sequence number. The instructions further cause the processor to determine a next segment of the data to transmit based on the acknowledgment sequence number.

In yet another implementation consistent with the present invention, a computer-readable medium that stores instructions executable by one or more processors is provided. The instructions cause the processor to generate at least one portion of a sequence number based on processing to be performed by a receiving device and to generate at least one other portion based on a relevant protocol specification. The instructions also cause the processor to transmit a data packet including a data segment and the sequence number to a receiving device.

In still another implementation consistent with the present invention, a method for transmitting a data stream in a number of discrete packets is provided, where each packet includes a segment of the data stream and a sequence number field. The method includes partitioning the sequence number field into portions. The method also includes generating a sequence number corresponding to the portions, where at least one portion identifies a particular segment of the data stream. The method further includes transmitting a data packet including a segment of the data stream and the sequence number to a receiving device.

In a further implementation consistent with the present invention, a device for transmitting a data stream in a number of discrete packets is provided. Each packet includes a segment of the data stream and at least one header field. The device includes logic configured to partition the header field into a plurality of subfields. The device also includes logic configured to generate a value for the header field in accordance with a transmission control protocol, where at least one subfield identifies a particular segment of the data stream. The device further includes logic configured to transmit a data packet including a segment of the data stream and the header field to a receiving device.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 illustrates an exemplary structure of a Transmission Control Protocol packet.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims.

Systems and methods consistent with the present invention permit a communication device having restricted memory resources to transmit data packets in a network. The communication device transmits the data packets without storing various transmission control record information in its local memory. The communication device relies upon peer devices to perform much of the record keeping associated with transmitting data streams as a series of discrete packets.

Exemplary Network

Figure 1:
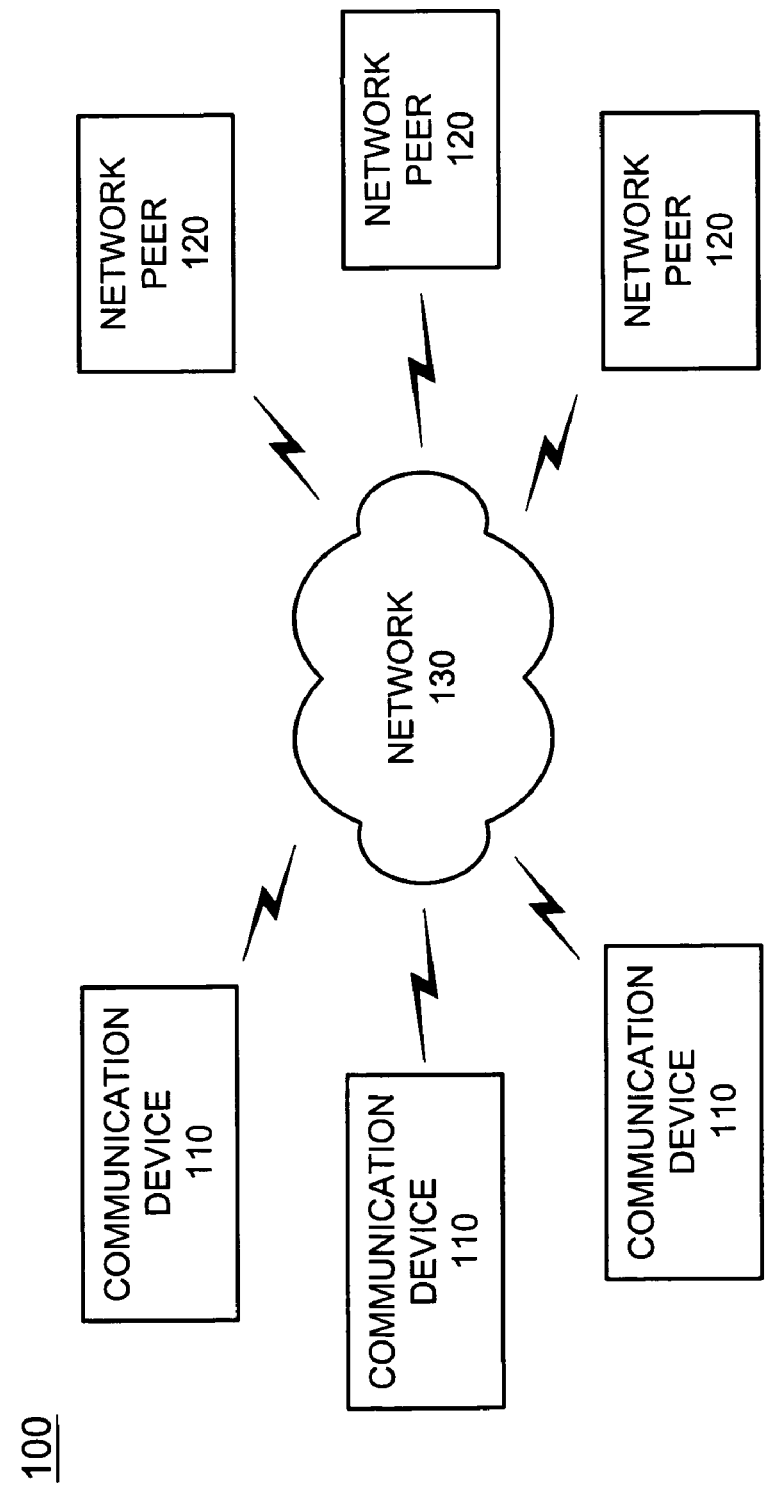
FIG. 1 illustrates an exemplary network in which systems and methods consistent with the present invention may be implemented.

FIG. 1 illustrates an exemplary network 100 in which systems and methods consistent with the present invention may be implemented. The network 100 may include communication devices 110 and network peers 120 connected to a network 130. Three communication devices 110 and three network peers 120 have been shown in FIG. 1 for simplicity. In practice, the network 100 may include more or less communication devices 110 and network peers 120.

The network 130 may include one or more data communication networks, such as the Internet, an intranet, a wide area network, or the like. For example, in one implementation consistent with the present invention, the network 130 includes a packet-based network that operates according to a communications protocol, such as a Transmission Control Protocol and all related protocols, as specified in "Requirements for Internet Hosts—Communication Layers," RFC1122, ftp://ftp.isi.edu/in-notes/rfc1122.txt, October 1989.

The communication devices 110 may include computer devices, electronic devices, or similar devices with or without extensive computational and/or memory resources. The communication devices 110 may connect to the network 130 via wired, wireless, or optical communication paths. In one implementation consistent with the present invention, the communication devices 110 connect to the network 130 using a data link protocol, such as the Serial Line Internet Protocol, Ethernet, or Token Ring.

The network peers 120 may include computer devices, such as personal computers, servers, laptops, personal digital assistants (PDAs), etc. that connect to the network 130 via wired, wireless, or optical communication paths. According to an implementation consistent with the present invention, the network peers 120 communicate with the communication devices 110 via data packetized in accordance with the relevant transmission control protocol, such as the Transmission Control Protocol. The network peers 120 may communicate with the communication devices 110 via a virtual circuit, a connection, or a socket through the network 130.

It should be noted that a communication device 110 may perform the role of a network peer 120 at various times in the same conversation or different conversations and vice versa. In other words, communication devices 110 may perform the functions described below as being performed by network peers 120. Similarly, network peers 120 may perform the functions described as being performed by communication devices 110.

Exemplary Communication Device

Figure 2:
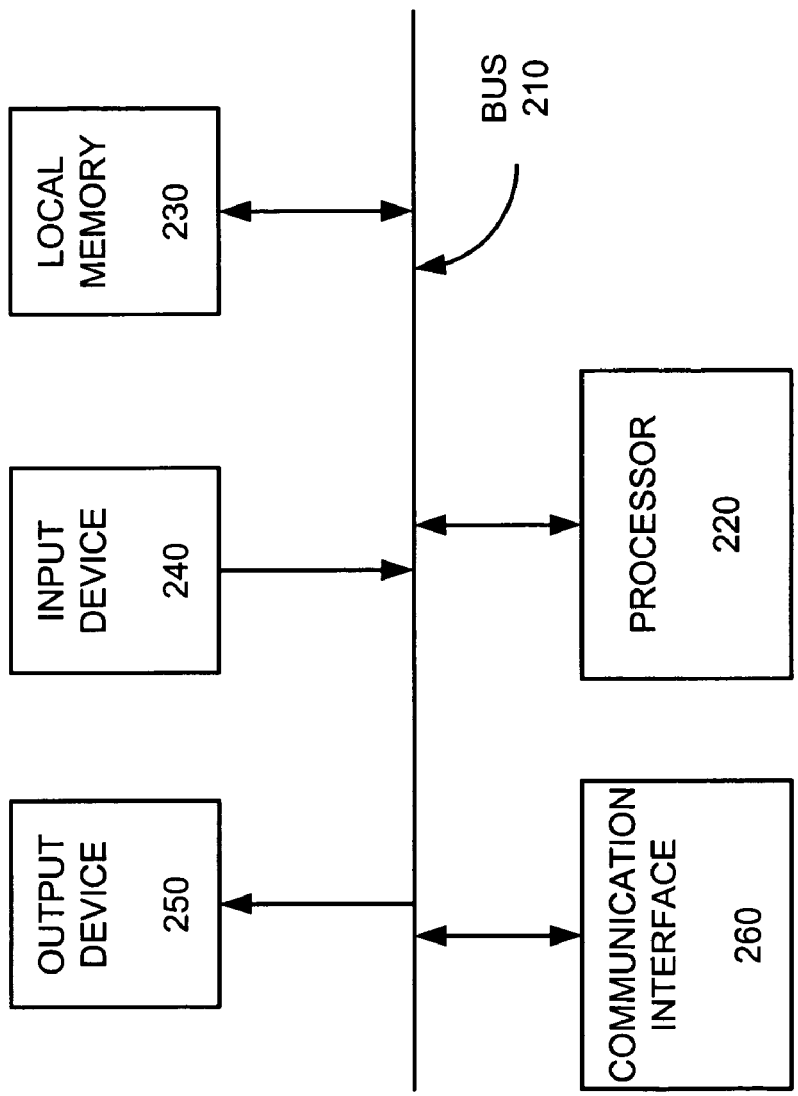
FIG. 2 illustrates an exemplary configuration of a communication device of FIG. 1 in an implementation consistent with the present invention.

FIG. 2 illustrates an exemplary communication device 110 consistent with an implementation of the present invention. The communication device 110 may include a bus 210, a processor 220, a local memory 230, an input device 240, an output device 250, and a communication interface 260. The bus 210 permits communication among the components of the communication device 110. It should be understood that additional busses (not shown) may connect one or more of the components of communication device 110.

The processor 220 may be any type of conventional processor or microprocessor that interprets and executes instructions. The local memory 230 may be a large or small capacity memory device, such as a random access memory (RAM), a read only memory (ROM), or another type of dynamic or static storage device that stores information and instructions for processing by the processor 220.

The input device 240 may include any conventional mechanism that permits a user to input information into the communication device 110, such as a keyboard, a keypad, a mouse, a microphone, data acquisition sensors, etc. The output device 250 may include any conventional mechanism that outputs information to the user, including a display, a speaker, transducers, actuators, etc. The communication interface 260 may include any transceiver-like mechanism that enables the communication device 110 to communicate with other devices and systems. For example, the communication interface 260 may include mechanisms for communicating via a network, such as the network 130.

Communication device 110, consistent with the present invention, may transmit a data file as a number of discrete packets over a network, such as network 130. In one implementation, communication device 110 transmits data without storing various record information, as described in more detail below. The communication device 110 performs these tasks in response to processor 220 executing sequences of instructions contained in a computer-readable medium, such as the memory 230. A computer-readable medium may include one or more memory devices and/or carrier waves.

The instructions may be read into memory 230 from another computer-readable medium or from another device via the communication interface 260. Execution of the sequences of instructions contained in memory 230 causes processor 220 to perform processes that will be described later. Alternatively, hardwired circuitry may be used in place of or in combination with software instructions to implement processes consistent with the present invention. For example, the functions performed by the components of communication device 110 may be fully implemented via a combination of logic gates formed in silicon. Thus, the present invention is not limited to any specific combination of hardware circuitry and software.

Exemplary Network Peer

Figure 3:
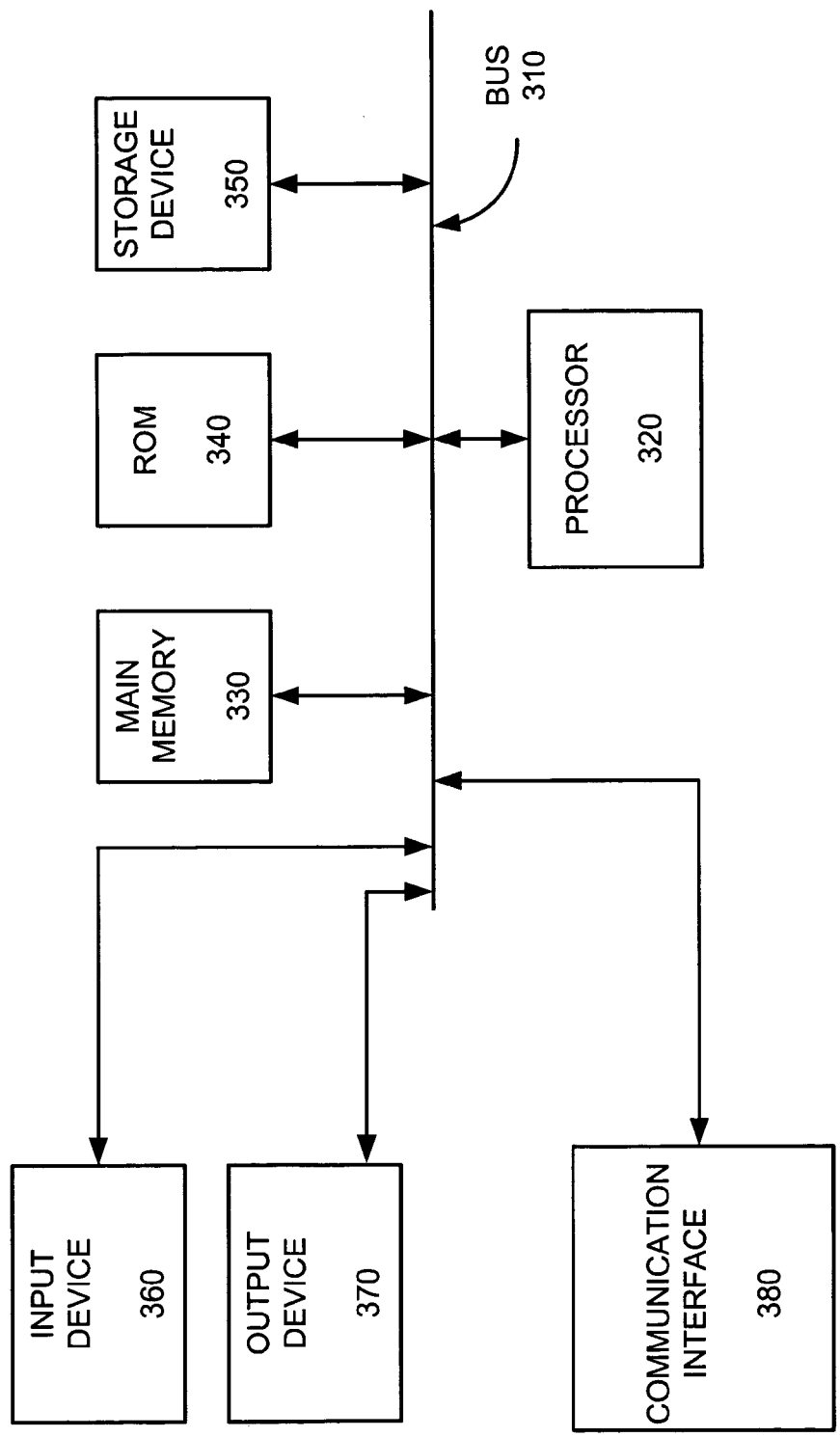
FIG. 3 illustrates an exemplary configuration of a network peer of FIG. 1 in an implementation consistent with the present invention.

FIG. 3 illustrates an exemplary network peer 120 consistent with the present invention. The exemplary network peer 120 includes a bus 310, a processor 320, a main memory 330, a ROM 340, a storage device 350, an input device 360, an output device 370, and a communication interface 380. The bus 310 permits communication among the components of the network peer 120. It should be understood that additional busses (not shown) may connect one or more of the components of network peer 120.

The processor 320 may include any type of conventional processor or microprocessor that interprets and executes instructions. The main memory 330 may include a RAM or another type of dynamic storage device that stores information and instructions for execution by the processor 320. Main memory 330 may also be used to store temporary variables or other intermediate information during execution of instructions by processor 320.

ROM 340 may include a conventional ROM device and/or another type of static storage device that stores static information and instructions for processor 320. The storage device 350 may include a magnetic disk or optical disk and its corresponding drive and/or some other type of magnetic or optical recording medium and its corresponding drive for storing information and/or instructions.

The input device 360 may include any conventional mechanism that permits an operator to input information to the network peer device 120, such as a keyboard, a mouse, a microphone, a pen, voice recognition and/or biometric mechanisms, data acquisition sensors, etc. The output device 370 may include any conventional mechanism that outputs information to the operator, including a display, a printer, a speaker, a transducer, an actuator, etc.

The communication interface 380 may include any transceiver-like mechanism that enables the network peer 120 to communicate with other devices and/or systems, such as communication devices 110. For example, the communication interface 380 may include a modem or an Ethernet interface to a network. Alternatively, communication interface 380 may include other mechanisms for communicating via a network, such as network 130.

The network peer 120 performs the functions described below in response to processor 320 executing sequences of instructions contained in a computer-readable medium, such as memory 330. The instructions may be read into memory 330 from another computer-readable medium, such as a storage device 350, or from a separate device via communication interface 380. Execution of the sequences of instructions contained in memory 330 causes processor 320 to perform the process steps that will be described hereafter. In alternative embodiments, hard-wired circuitry may be used in place of or in combination with software instructions to implement the present invention. For example, the functions performed by the components of network peer 120 may be fully implemented via a combination of logic gates formed in silicon. Thus, the present invention is not limited to any specific combination of hardware circuitry and software.

Exemplary Processing

Figure 4:
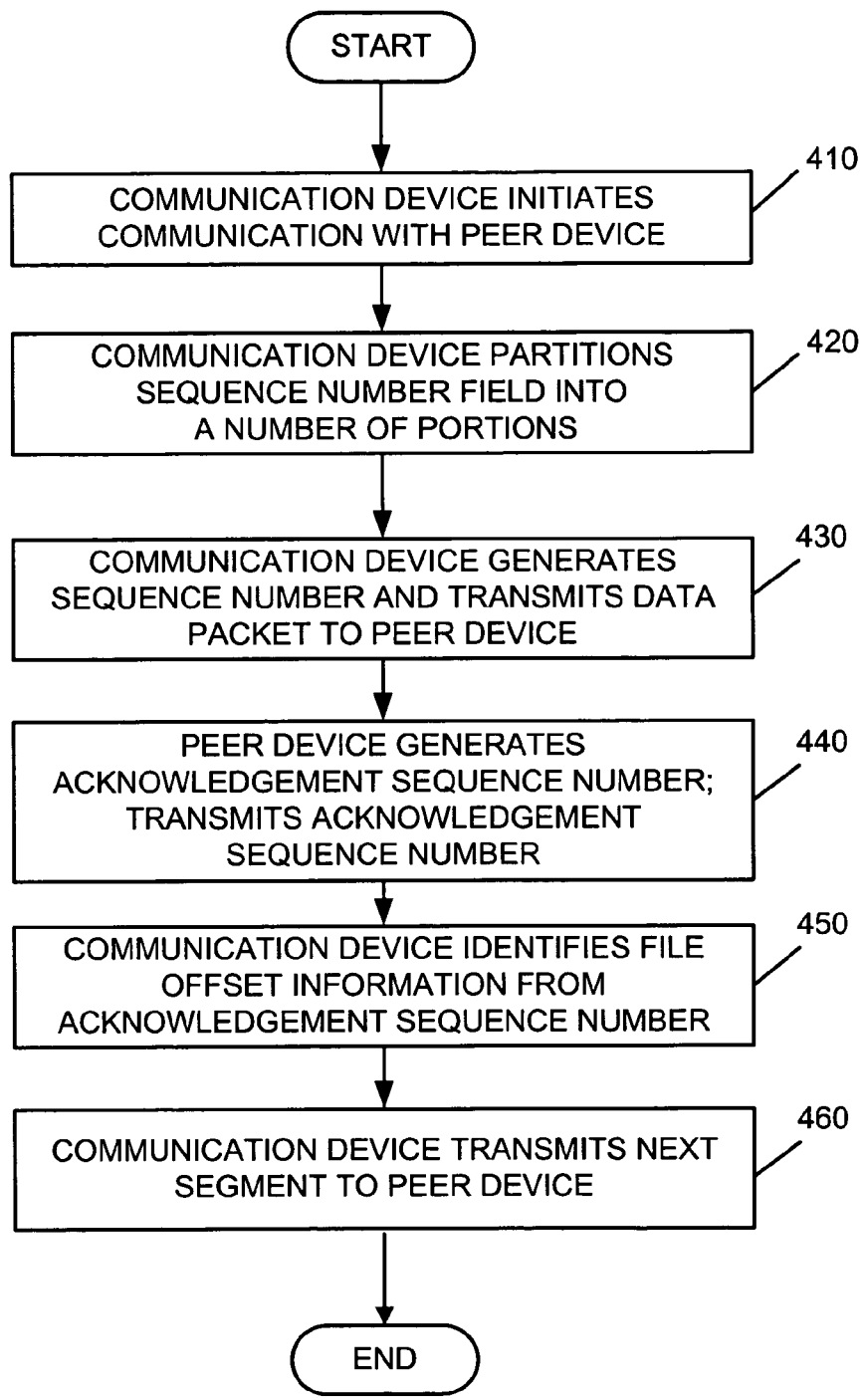
FIG. 4 illustrates exemplary processing, consistent with the present invention, for transmitting data in a network.

FIG. 4 illustrates an exemplary process, consistent with the present invention, for transmitting data via a network. Processing begins when a communication device, such as communication device 110 (FIG. 1), wishes to transmit a data stream via network 130 [step 410]. The data stream may represent a file or any data message destined for a network peer, such as network peer 120. As described above, the communication device 110, in an implementation consistent with the present invention, may have a restricted memory capacity. As a result, the communication device 110 may be incapable of performing the necessary record keeping associated with transmitting a file via a particular protocol, such as Transmission Control Protocol.

For example, in a conventional Transmission Control Protocol network, a sending device transmits data streams, such as data files, as a number of separate packets. FIG. 5 illustrates an exemplary data packet 500 consistent with the Transmission Control Protocol. The Transmission Control Protocol packet 500 includes a source port field, a destination port field, a sequence number field, an acknowledge number field, a header length field, a reserved field, a flags field, a window size field, a checksum field, an urgent pointer field, an options field and a data field. The source port and destination port fields include data that identify the source and destination of the data packet. The sequence number field includes data that identifies the first byte of data in the packet. The acknowledge number field includes data that identifies the next byte of data that the source expects to receive from the destination.

The header length field includes data that identifies the length of the header. The reserved field may be used for future expansions. The flags field may include several flags, such as Urgent, Acknowledge, Push, Reset, Synchronize, and Finish. The Urgent flag indicates whether the data in the urgent pointer field is valid. The Acknowledge flag indicates whether the data in the acknowledgement number field is valid. The Push flag indicates whether the accompanying data should be passed to the application at the destination in an expedited manner. The Reset flag indicates whether the connection should be reset. The Synchronize flag is used to establish an initial agreement on the sequence numbers. The Finish flag indicates whether the source has finished sending data.

The window size field includes data that identifies the amount of space the destination has available for storage of unacknowledged data. The checksum field includes a checksum value that may cover both the header and the data stored in the packet. The urgent pointer field includes data that identifies whether this packet should take priority over the normal data stream.

The options field may contain any of a number of predefined options. The data field includes the actual payload of the data packet 500. The length of the data field may vary based on a number of factors, such as the maximum expected file size, network operating parameters, etc.

When a packet is sent, a conventional sending device stores transmission control records associated with the transmitted packet. The transmission control records typically include file offset information indicating what portion of the file has been sent. The file offset information may be stored as an offset pointer in local memory that enables the sending device to know which portion of the data file to transmit next. The transmission control records also typically include the Transmission Control Protocol sequence number transmitted with the packet.

The conventional sending device stores such transmission control records for each connection it maintains. When multiple data conversations occur simultaneously, storing such record information for each conversation would take a considerable amount of space in the local memory of a sending device, such as local memory 230. According to an exemplary implementation, the communication device 110 avoids storing this record information by taking advantage of record keeping performed by peer devices, such as network peer 120, as described in more detail below.

The communication device 110, consistent with the present invention, partitions the sequence number field into a number of portions [step 420]. For example, according to an exemplary implementation, the communication device 110 may partition the 32-bit sequence number field used in a conventional Transmission Control Protocol data packet, such as packet 500, into a number of portions.

Figure 6:
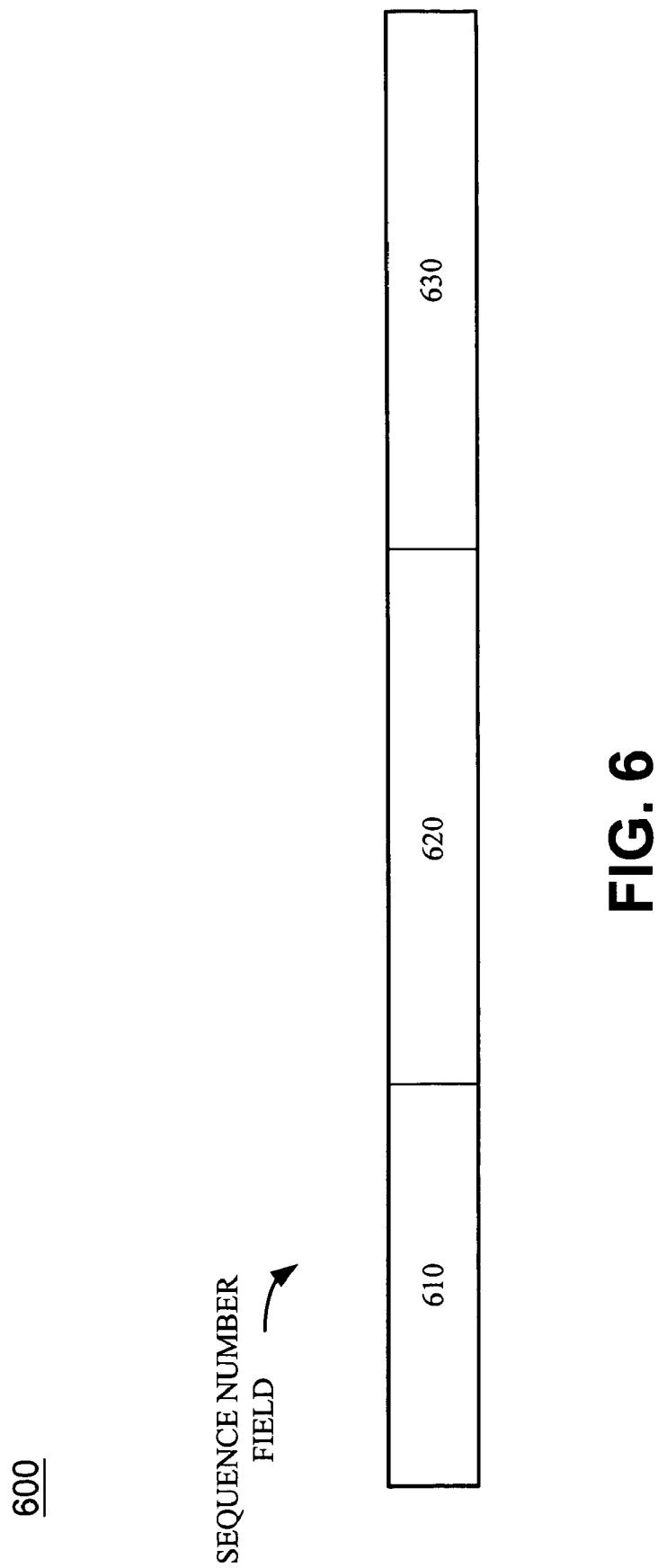
FIG. 6 illustrates an exemplary sequence number field in an implementation consistent with the present invention.

FIG. 6 illustrates an exemplary sequence number field 600 partitioned in a manner consistent with the present invention. The sequence number field 600 may be divided into fields 610, 620 and 630. In alternative implementations of the present invention, the sequence number field 600 may be divided into different numbers of fields. Field 630 may represent the least significant bits and field 610 may represent the most significant bits of sequence number field 600. The size of fields 610, 620 and 630 may be based on a number of factors, such as the packet size used by communication device 110 to transmit data, maximum expected file sizes, etc.

Assume that communication device 110 transmits data packets having 1 Kbyte data payloads. It should be understood that 1 Kbyte represents $2^{10}$ bits or 1024 bits of data. In this case, the communication device 110 may set the size of field 630 to be 10 bits in length. That is, the size of field 630 may be set to n bits when the length of the data segments transmitted is $2^n$ bits. By setting field 630 to be 10 bits in this example, the communication device 110 may take advantage of some conventional and predictable processing performed by the network peer 120, as described in more detail below. It should be understood, however, that other correlations between both the number and size of the fields in sequence number field 600 and the size of the data segments transmitted via network 130 may be made in other implementations consistent with the present invention. Based on the guidance given herein, one of ordinary skill in this art would be able to set the various field sizes in the sequence number field 600 to take advantage of the conventional record keeping performed by peer devices, enabling the communication device 110 to avoid storing transmission control record information in its local memory.

The communication device 110 then generates the actual sequence number [step 430]. The communication device 110, consistent with the present invention, generates the actual values for fields 610 and 630 in a manner necessary to comply with the relevant protocol specification. For example, in a Transmission Control Protocol network, the communication device 110 generates the values for fields 610 and 630 in a manner such that sequence number field 600 complies with the protocol specification.

The actual value for field 620, however, may be chosen to represent a particular offset associated with a particular segment of the data file. In other words, unlike conventional devices transmitting data in a Transmission Control Protocol based network which generates the entire sequence number in accordance with the protocol specification, communication device 110 chooses the value for field 620 to take advantage of predictable processing performed by a network peer 120.

For example, suppose communication device 110 wishes to transmit a 20 Kbyte data file in 1 Kbyte data segments. In this case, the communication device 110 may choose the value in field 620 to be "0" when transmitting the first 1 Kbyte segment in the data file. The "0" indicates that the data segment is the initial 1 Kbyte segment in the data file, i.e., the data segment is offset zero bytes from the beginning of the file. The communication device 110 then transmits the packet to network peer 120 [step 430].

The network peer 120 receives the packet including sequence number 600. In accordance with the Transmission Control Protocol requirements, network peer 120 generates an acknowledgement message including the next expected sequence number [step 440]. That is, the network peer 120 receives the 1 Kbyte segment and, in accordance with Transmission Control Protocol requirements, increments the received sequence number by 1024. In this case, incrementing the received sequence number by 1024 is equivalent to incrementing field 620 by "1," since field 630 is 10 bits in length and $2^{10}$=1024. The network peer 120 then transmits the acknowledgment message, including the acknowledgement sequence number, to the communication device 110 [step 440].

The communication device 110 receives the acknowledgement message transmitted via network 130. The communication device 110 then examines the acknowledgement sequence number and identifies the file offset information [step 450]. In this example, assuming that the communication device 110 transmitted a "0" in field 620 of the sequence number field 600, the communication device 110 determines that the value in field 620 associated with the acknowledgment sequence number is "1." This value of "1" indicates that communication device 110 would send the first offset of the 20 Kbyte file next (i.e., the second Kbyte of the data file). The communication device 110 then transmits the second Kbyte of data from the data file to the network peer 120 along with the new sequence number [step 460].

This process repeats until all of the data segments of the data file have been transmitted to the network peer 120. During the entire process associated with transmitting the data file, communication device 110 relies upon the network peer 120 to perform the processing required to identify the next segment of data to transmit. In this manner, communication device 110 may communicate with multiple peer devices without having to store transmission control records, such as local pointers identifying file offset information, in local memory 230 for any of the data conversations in which communication device 110 may be involved. This saves considerable memory and enables a processing device with limited memory to transmit data packets in a network.

Systems and methods consistent with the present invention enable a communication device having limited memory to transmit data over a packet-based network. The communication device advantageously relies upon network peers to perform much of the record keeping associated with transmitting a data file as a number of discrete packets, thereby saving the limited memory space for other functions.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while a series of steps have been described with respect to FIG. 4, the order of the steps may vary in other implementations consistent with the present invention.

It should also be understood that sequence number field has been illustrated as being divided into three portions with the middle portion used for identifying the segment of the data file. In alternative implementations, the sequence number field may be divided into other numbers of portions and the portion used to identify the segment of the data file may be represented by a different portion.

It should further be understood that in alternative implementations of the present invention, the field being manipulated to convey file offset information may be a field other than a sequence number field. For example, another field in a data packet may be manipulated to convey file offset information, while still satisfying the constraints associated with that field in the relevant protocol. In this case, the communication device 110 transmits the packet to a network peer 120 and after some predictable processing of that field by the network peer 120, communication device 110 is able to identify the file offset information.

Further, the data stream being transmitted has been described as a data file. In other implementations of the present invention, the data stream may include data messages, application generated data or any other data stream that may be broken up into segments and transmitted over a packet-based network.

Additionally, in further alternative implementations of the present invention, instead of manipulating various fields into subfields to convey file offset information, a mathematical function may be used. For example, communication device 110 may use a function F(a,b) to generate a particular field in a data packet, where "b" is the information of interest and "a" is the portion that assures compliance with the protocol requirements, such that F(a,b) is fully compliant with the relevant protocol. The network peer 120 then receives the packet including the information generated from F(a,b) and applies some function "G" to generate G(F(a,b)). The network peer 120 then transmits the information from G(F(a,b)) back to the communication device 110 in an acknowledgement message. The communication device 110 applies a reverse process, i.e., applies a function GFInverse ( ) to G(F(a,b)) from the acknowledgement message to identify the information of interest "b." The information b may be a modified version of the data sent to the network peer 120.

In the exemplary implementation described above in which a field is broken into subfields, the function F(a,b,c) may be a simple function that concatenates the bit fields a, b and c (e.g., fields 610, 620 and 630 in FIG. 6). The function GFInverse ( ) may be a corresponding function that extracts bitfield b. In alternative implementations, however, other mathematical functions may be used.

In essence, a device, such as communication device 110, may use any mathematical function to transmit information to a peer device, such as network peer 120, to take advantage of predictable processing performed by the network peer 120. The communication device 110 may then extract particular information of interest from an acknowledgement message transmitted back to the communication device 110. In this manner, the communication device 110 is able to save valuable local memory space.

The scope of the invention is defined by the following claims and their equivalents.

What is claimed is:

1. A method for transmitting data as a number of segments in separate packets, each packet including a sequence number field, the method comprising:
  generating a sequence number that includes a plurality of portions, with at least one portion of the sequence number identifying a particular segment of the data within a file, the at least one portion of the sequence number being based on predictable processing performed by the receiving device and the other portions of the sequence number being generated in accordance with a specification of a relevant transmission protocol;
  transmitting to a receiving device a data packet including the particular segment of the data and the associated sequence number;
  receiving a corresponding acknowledgement packet from the receiving device, the acknowledgement packet including an acknowledgment sequence number that is based on the predictable processing of the sequence number in the transmitted packet; and
  determining an offset that corresponds to the next segment of the data within the file to transmit based on one or more portions of the received acknowledgment sequence number that correspond to the at least one portion of the associated sequence number.

2. The method of claim 1, wherein the at least one portion of the acknowledgement sequence number includes an incremented version of the at least one portion of the sequence number transmitted to the receiving device and the determining step further includes identifying the next segment to transmit based on the incremented version.

3. The method of claim 1, wherein the transmitting step includes transmitting the data packet using transmission control protocol/Internet protocol (TCP/IP).

4. The method of claim 1, further comprising:
  repeating the transmitting, receiving and determining steps for additional segments of the data until all the segments of the data have been transmitted.

5. The method of claim 1, wherein the transmitting step includes transmitting the data packet without storing information identifying the segment being transmitted to the receiving device.

6. The method of claim 1, wherein the plurality of portions includes a least significant portion, wherein the partitioning step includes setting the length of the least significant portion based on the length of the segments transmitted.

7. The method of claim 6, wherein the setting step includes:
  setting the length of the least significant portion to n bits when the length of the segments transmitted is $2^n$ bits.

8. A system for transmitting data in a network, the data including a number of segments transmitted in separate packets, the system comprising:
  a memory configured to store instructions; and
  a processor configured to execute the instructions to:
    generate a sequence number including a plurality of portions, at least one portion indicating a particular segment of the data within a file, the at least one portion of the sequence number being based on predictable processing performed by a receiving device and the other portions of the sequence number being generated in accordance with a specification of a relevant transmission protocol,
    transmit a data packet including the particular segment of the data and the sequence number to the receiving device, receive a corresponding acknowledgement packet from the receiving device, the acknowledgement packet including an acknowledgment sequence number that is based on the predictable processing of the sequence number in the transmitted packet, and determine an offset to a next segment of the data in the file to transmit based on one or more portions of the acknowledgment sequence number that correspond to the at least one portion of the associated sequence number.

9. The system of claim 8, wherein the at least one portion of the acknowledgement sequence number includes an incremented version of the at least one portion of the sequence number transmitted to the receiving device and wherein when determining, the processor:

identifies the next segment to transmit based on the incremented at least one portion of the sequence number.

10. The system of claim 8, wherein when transmitting, the processor: transmits the data packet using transmission control protocol/Internet protocol (TCP/IP).

11. The system of claim 8, wherein the processor is further configured to: repeat the transmitting, receiving and determining for additional segments of the data until all the segments of the data have been transmitted and acknowledged.

12. The system of claim 8, wherein when transmitting, the processor: transmits the data packet without storing information identifying the segment being transmitted to the receiving device.

13. The system of claim 8, wherein the plurality of portions includes a first portion, and the processor is further configured to:

set the length of the first portion based on the length of the segments transmitted.

14. The system of claim 13, wherein when setting, the processor is configured to:

set the length of the first portion to n bits when the length of the segments transmitted is $2^n$ bits.

15. A computer-readable medium having stored thereon a plurality of sequences of instructions, said sequences of instructions including instructions which, when executed by at least one processor, cause said processor to perform the steps of:

generating a sequence number including a plurality of portions, at least one portion identifying a particular segment of data within a file, the at least one portion of the sequence number being based on predictable processing performed by the receiving device and the other portions of the sequence number being generated in accordance with a specification of a relevant transmission protocol;

transmitting a data packet including the particular segment of the data and the sequence number to a receiving device;

receiving corresponding acknowledgement packet from the receiving device, the acknowledgement packet including an acknowledgment sequence number that is based on the predictable processing of the sequence number in the transmitted packet; and determining an offset to a next segment of the data in the file to transmit based on one or more portions of the acknowledgment sequence number that correspond to the at least one portion of the associated sequence number.

16. The computer-readable medium of claim 15, wherein the at least one portion of the acknowledgement sequence number includes an incremented version of the at least one portion of the sequence number transmitted to the receiving device and wherein the determining includes identifying the next segment to transmit based on the incremented at least one portion of the sequence number.

17. The computer-readable medium of claim 15, wherein the transmitting includes:

transmitting the data packet using transmission control protocol/Internet protocol (TCP/IP).

18. The computer-readable medium of claim 15, including instructions for causing the processor to perform the further steps of:

repeating the transmitting, receiving and determining for additional segments of the data until all the segments of the data have been transmitted.

19. The computer-readable medium of claim 15, wherein the transmitting includes:

transmitting the data packet without storing information identifying the segment being transmitted to the receiving device.

20. The computer-readable medium of claim 15, wherein the plurality of portions includes a least significant portion, the computer-readable medium including instructions for causing said processor to perform the further steps of:

setting the length of the least significant portion based on the length of the segments transmitted.

21. The computer-readable medium of claim 20, wherein the setting includes: setting the length of the least significant portion to n bits when the length of the segments transmitted is $2^n$ bits.

22. A system for transmitting a data stream as a number of discrete packets, each packet including a sequence number, the system comprising:

means for generating a sequence number including a plurality of portions, at least one portion identifying a particular segment of the data stream, the at least one portion of the sequence number being based on predictable processing performed by the receiving device and the other portions of the sequence number being generated in accordance with a specification of a relevant transmission protocol;

means for sending a data packet including a first segment of the data stream and the associated sequence number to a receiving device;

means for obtaining a corresponding acknowledgement packet from the receiving device, the acknowledgement packet including an acknowledgment sequence number that is based on the predictable processing of the sequence number in the transmitted packet; and means for determining an offset that corresponds to the next segment of the data stream within the file to transmit based on one or more portions of the received acknowledgment sequence number that correspond to the at least one portion of the associated sequence number.

23. A method for transmitting a data stream in a number of discrete packets, each packet including a segment of the data stream and at least one header field, the method comprising:

providing a first function to generate the header field in compliance with a transmission control protocol;

generating the header field using the first function and including in the header field information that represents an associated file offset the information being generated based on predictable processing performed by a receiving device;

transmitting to the receiving device a data packet including the segment of the data stream that corresponds to the offset within the file and the header field;
receiving an acknowledgement packet from the receiving device, the acknowledgment packet including a file offset value that is based on the predictable processing of the associated file;
applying a second function to a portion of the acknowledgement packet corresponding to the header field; and
identifying file offset information relating to a next data segment from results of applying the second function.

24. The method of claim 1, wherein the data represents at least one of a data file, a data message and application generated data.

25. The system of claim 8, wherein the data represents at least one of a data file, a data message and application generated data.

26. The computer-readable medium of claim 15, wherein the data represents at least one of a data file, a data message and application generated data.

* * * * *